US012775611B2

(12) United States Patent
Day

(10) Patent No.: US 12,775,611 B2
(45) Date of Patent: Oct. 27, 2026

(54) SECURE MESSAGE DELIVERY FOR REMOTE TRANSACTIONS

(71) Applicant: John W. Day, San Jose, CA (US)

(72) Inventor: John W. Day, San Jose, CA (US)

(*) Notice: Subject to any disclaimer, the term of this patent is extended or adjusted under 35 U.S.C. 154(b) by 0 days.

(21) Appl. No.: 19/020,493

(22) Filed: Jan. 14, 2025

(65) Prior Publication Data

US 2025/0156402 A1 May 15, 2025

Related U.S. Application Data

(63) Continuation-in-part of application No. 17/964,811, filed on Oct. 12, 2022, now Pat. No. 12,198,134.

(51) Int. Cl.

| | |
|---|---|
| ***G06F 16/23*** | (2019.01) |
| ***G06Q 20/02*** | (2012.01) |
| ***G06Q 20/38*** | (2012.01) |
| ***G06Q 20/40*** | (2012.01) |
| ***H04L 9/08*** | (2006.01) |
| ***H04L 9/12*** | (2006.01) |
| ***H04L 9/32*** | (2006.01) |

(52) U.S. Cl.
CPC ................................ *G06F 16/2379* (2019.01)

(58) Field of Classification Search
CPC ................ G06F 16/2379; G06Q 20/02; G06Q 20/3823; G06Q 20/3827; G06Q 20/401; G06Q 20/4015; G06Q 20/405; H04L 9/0875; H04L 9/12; H04L 9/3226; H04L 9/3297
See application file for complete search history.

(56) References Cited

U.S. PATENT DOCUMENTS

| | | | |
|---|---|---|---|
| 6,728,880 | B1 | 4/2004 | Sites et al. |
| 6,772,361 | B1 | 8/2004 | Walsh |
| 6,993,656 | B1 | 1/2006 | Peyravian et al. |
| 8,195,849 | B2 | 6/2012 | Williams et al. |
| 8,649,400 | B2 | 2/2014 | Darr et al. |
| 9,225,746 | B2 | 12/2015 | Osborne et al. |
| 11,671,268 | B2 | 6/2023 | Houston |
| 2006/0282668 | A1 | 12/2006 | Leitch |

(Continued)

FOREIGN PATENT DOCUMENTS

| | | |
|---|---|---|
| JP | 2003101528 | 4/2003 |

*Primary Examiner* — Charles Rones
*Assistant Examiner* — Mohammad S Bhuyan

(57) ABSTRACT

Embodiments of the present invention provide systems and methods for delivering messages between multiple devices of a communications network with a certainty of success using nodes of real-time computer systems, for example. The messages can include instructions related to transactions such as reading and/or writing data to a database, and a clock value of one or more of the devices can be used to authorize parties to the transaction, to encrypt and/or decrypt messages, to guarantee with high likelihood that messages related to the transaction are delivered successfully. According to various embodiments, a node can be a personal computer, smartphone, cloud-based or mainframe server, appliance, Internet-of-Things (IoT) device, an automobile, wearable electronic device, etc., or any other electronic device including a processor and means of electronic communication (e.g., Wi-Fi or ethernet), and some devices may communicate via entanglement aka "spooky action at a distance."

20 Claims, 13 Drawing Sheets

(56) References Cited

U.S. PATENT DOCUMENTS

| | | | | |
|---|---|---|---|---|
| 2009/0216666 | A1* | 8/2009 | Antao | G06Q 20/405 705/30 |
| 2009/0217037 | A1 | 8/2009 | Courtay et al. | |
| 2010/0091984 | A1 | 4/2010 | Kerschbaum et al. | |
| 2010/0281490 | A1* | 11/2010 | Powell | G06Q 20/00 709/204 |
| 2013/0212528 | A1 | 8/2013 | Lazaridis | |
| 2015/0115027 | A1 | 4/2015 | Carpenter | |
| 2017/0185789 | A1 | 6/2017 | Khosravi et al. | |
| 2017/0195303 | A1 | 7/2017 | Smith | |
| 2019/0342101 | A1 | 11/2019 | Hayes | |
| 2019/0354133 | A1 | 11/2019 | Lee et al. | |
| 2023/0179587 | A1* | 6/2023 | Wilson Thampi | G06Q 20/405 726/9 |
| 2023/0292265 | A1 | 9/2023 | Aijaz | |
| 2024/0089087 | A1 | 3/2024 | Ragan | |

* cited by examiner

350

| Time | $s_i$ | $s_j$ |
|---|---|---|
| First Boot | 2000 | 300 |
| $t_1$ | 3000 | 4750 |
| $t_2$ | 55000 | 136750 |
| $t_3$ | 100000 | $s_j.t_3$ |
| $t_n$ | $s_i.t_n$ | $s_i.t_n$ |

FIG. 3B

CONTINUING FROM FIG. 11A

SECURE MESSAGE DELIVERY FOR REMOTE TRANSACTIONS

CROSS-REFERENCE TO RELATED APPLICATIONS

The present application is a continuation-in-part (CIP) of copending U.S. patent Ser. No. 17/964,811, filed on Oct. 12, 2022, entitled "ENCRYPTION KEY BASED ON SYSTEM CLOCK CHARACTERISTICS," issuing as U.S. Pat. No. 12,198,134 naming John W. Day as inventor. The present application is also related to copending U.S. patent Ser. No. 17/964,819, filed on Oct. 12, 2022, entitled "SYSTEM IDENTIFICATION BASED ON DETERMINED CLOCK INFORMATION," naming John W. Day as inventor, and to copending U.S. patent Ser. No. 17/964,811, filed on Oct. 12, 2022, entitled "ENCRYPTION KEY BASED ON SYSTEM CLOCK CHARACTERISTICS," issuing as U.S. Pat. No. 12,198,134 also naming John W. Day as inventor, which are both incorporated herein by reference in their entirety and for all purposes.

FIELD

Embodiments of the present invention generally relate to the field of computer communication and messaging including electronic transactions and record keeping. More specifically, embodiments of the present invention relate to systems and methods for computer system identification and subsequent secure electronic transactions performed in real-time between multiple computer systems.

BACKGROUND

Current approaches to electronic transactions between different devices require complex procedures to identify and authorize parties to the transaction to authenticate a system and ensure the safety and security of the transaction. The added time, resources, and complexity required to identify and authorize parties to the transaction can make these transactions unduly burdensome on systems that process several transactions between different parties at a given time. Many computer communications demand a high degree of certainty and security, e.g., financial transaction-based messages, where system identification and subsequent authorization play a major role in providing the requisite security. These demands are especially important for banking systems, stock market traders, and airline reservation systems, for example.

Moreover, existing approaches to electronic transactions may be susceptible to fraud and tampering by parties that are able to obtain a key or identification number used to access accounts that issue the transactions, and for maintaining consistent records of transactions among multiple devices (e.g., computer systems, databases, etc.). A less complicated and more efficient approach to secure communication between devices, including a way to ensure with high likelihood that a message is successfully delivered to its intended recipient, is desired. A more efficient and less complex method of transmitting and acknowledging a private message as part of the solution for electronic communication is desired.

SUMMARY OF THE INVENTION

What is needed is an approach to electronic transactions that can ensure with a high degree of accuracy that a transaction has been completed. Accordingly, embodiments of the present invention provide apparatus and methods for delivering messages between multiple devices of a communications network with a certainty of agreement between endpoints using nodes of real-time computer systems, for example. The messages can include instructions related to transactions such as reading and/or writing data to a database, and a clock value of one or more of the devices can be used to authorize parties to the transaction, to encrypt and/or decrypt messages, and indicating with high likelihood that messages related to the transaction are delivered successfully. According to various embodiments, a node can be a personal computer, smartphone, cloud-based or mainframe server, appliance, Internet-of-Things (IoT) device, an automobile, wearable electronic device, etc., or any other electronic device including a processor and means of electronic communication (e.g., Wi-Fi or ethernet).

According to one described embodiment, a method of conducting an electronic transaction between remote computer systems is disclosed. The method includes transmitting a first message comprising transaction metadata from a first computer system for receipt by a second computer system, the second computer system interrupting a line handler of the second computer system and modifies a database of the second computer system responsive to receiving the first message, transmitting a second message comprising the transaction metadata from the first computer system to a third computer system, the third computer system auditing a transaction record stored at the third computer system responsive to receiving the second message, receiving a transaction acknowledgment at the first computer system from the third computer system, and marking the transaction as complete at the first computer system.

According to some embodiments, the metadata of the first messages comprises a clock rate of the first computer system.

According to some embodiments, the method includes the second computer system verifying an identity of the first computer system according to the clock rate of the first computer system.

According to some embodiments, the method includes the second computer system decrypting content of the first message according to the clock rate of the first computer system.

According to some embodiments, the metadata of the first messages comprises location information of the first computer system.

According to some embodiments, the method includes the second computer system verifying an identity of the first computer system according to the location information of the first computer system.

According to some embodiments, the method includes modifying a database of the first computer system prior to transmitting the first message comprising transaction metadata from the first computer system for receipt by the second computer system.

According to some embodiments, the method includes identifying a crash of the second computer system prior to marking the transaction as complete at the first computer system, and rolling back the database of the first computer system to a prior state.

According to some embodiments, the method includes the second computer system transmitting another transaction acknowledgement to the third computer system, wherein the third computer system marks the transaction as pending complete at the time the another transaction acknowledgment is received.

According to another embodiment, an apparatus is disclosed, including a processor and a database. The processor is operable to initiate a transaction by modifying the database according to transaction metadata, transmit a first message comprising the transaction metadata for receipt by a second computer system, the second computer system interrupting a line handler of the second computer system and modifies a database of the second computer system responsive to receiving the first message, transmit a second message comprising the transaction metadata to a third computer system, the third computer system auditing a transaction record stored at the third computer system responsive to receiving the second message, receive a transaction acknowledgment at the first computer system from the third computer system, and mark the transaction as complete at the first computer system.

According to another embodiment, a non-transitory computer-readable storage medium having embedded therein program instructions, which when executed by one or more processors of a device, causes the device to execute a process that automatically conducts an electronic transaction with a remote computer system is disclosed. The process includes transmitting a first message comprising transaction metadata from a first computer system for receipt by a second computer system, the second computer system interrupting a line handler of the second computer system and modifies a database of the second computer system responsive to receiving the first message, transmitting a second message comprising the transaction metadata from the first computer system to a third computer system, the third computer system auditing a transaction record stored at the third computer system responsive to receiving the second message, receiving a transaction acknowledgment at the first computer system from the third computer system, and marking the transaction as complete at the first computer system.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 3B is a block diagram of exemplary data tables constructed based on the exemplary messages of FIG. 3A according to embodiments of the present invention.

DETAILED DESCRIPTION

Figure 1:
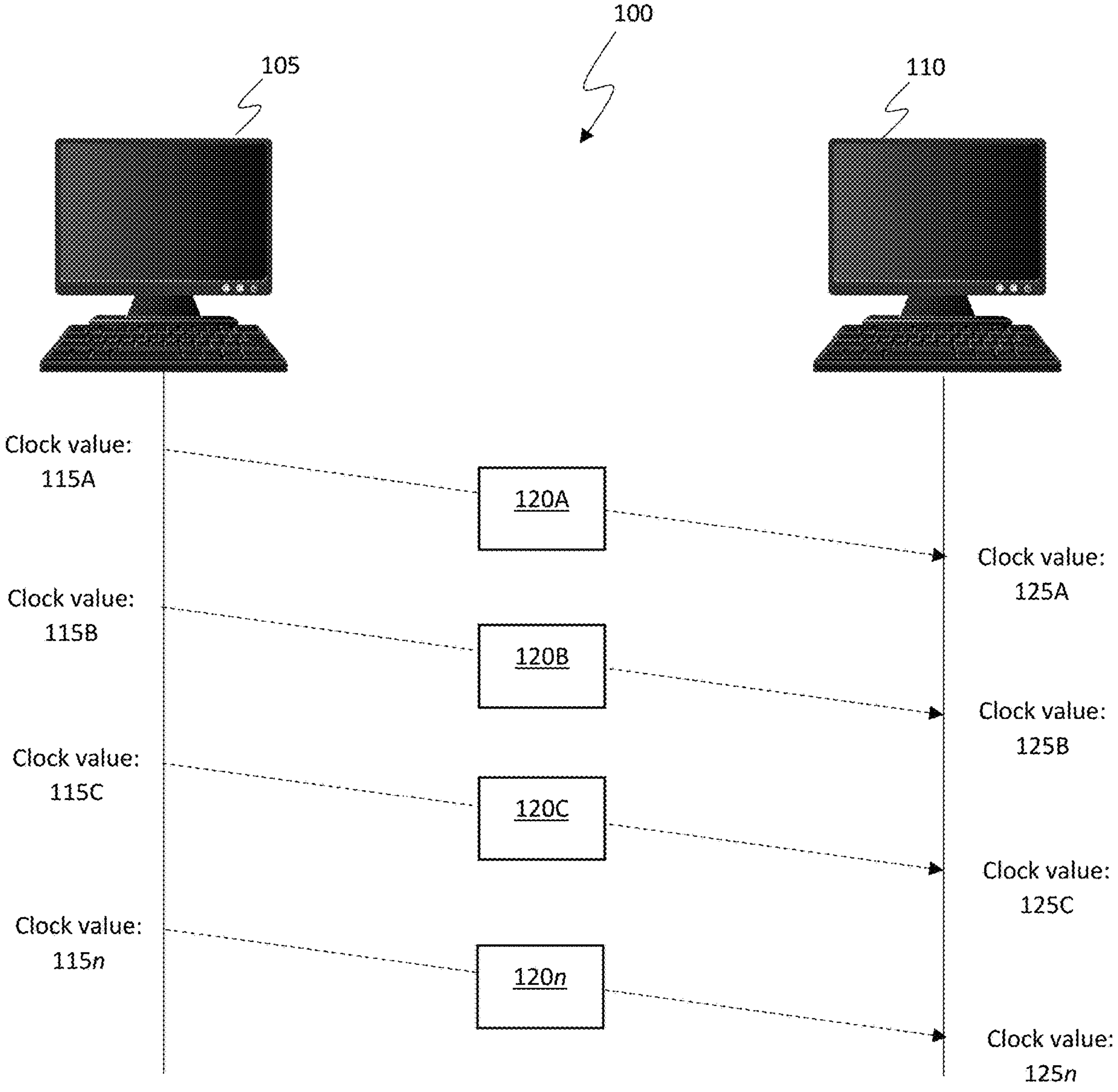
FIG. 1 is a block diagram depicting an exemplary electronic transaction performed between electronic communication systems for determining clock values of a system and for determining a relationship between clock rates of different devices according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 4 and 5) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as “accessing,” “displaying,” “writing,” “including,” “storing,” “rendering,” “transmitting,” “traversing,” “associating,” “identifying” or the like, refer to the action and processes of a computer system, or similar electronic computing device, that manipulates and transforms data represented as physical (electronic) quantities within the computer system’s registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Device Identification Based on Processor Clock Values and Rates

Embodiments of the present invention provide apparatus and methods for delivering messages between multiple devices of a communications network with a very high probability of success using nodes of real-time computer systems, for example. The messages can include instructions related to transactions such as reading and/or writing data to a database, and a clock value of one or more of the devices can be used to authorize parties to the transaction, to encrypt and/or decrypt messages, and indicating with high likelihood that messages related to the transaction are delivered successfully. According to various embodiments, a node can be a personal computer, smartphone, cloud-based or mainframe server, appliance, Internet-of-Things (IoT) device, an automobile, wearable electronic device, etc., or any other electronic device including a processor and means of electronic communication (e.g., Wi-Fi or ethernet). Some devices (e.g., quantum computers) may be capable of communicating via other means, such as entanglement aka “spooky action at a distance.”

Modern multi-processor computer systems typically include one or more clocks used to keep track of time for performing important functions (e.g., OS-level functions) and operating the processor or processors efficiently. In a multi-processor system, only one clock value is typically used for encryption and system identification according to embodiments. A system clock or timer may be initialized when a system first comes online, and the clock’s value (e.g., tick count) is incremented once every clock cycle. The value of the clock can be accessed by the computer’s operating system (e.g., an MCP) during operation and the clock value can be represented by a clock register which can be quite large, e.g., 128 bits, which is sufficient to cover the life of the universe measured in $10^{-6}$ femtoseconds, although any suitable size can be used (e.g., 64 bits or 256 bits). Embodiments of the present invention can transmit messages that include the value of the transmitting node’s clock at the time the message was transmitted.

After several such messages are transmitted by the transmitting node, the receiver node is able to construct a data table from the clock information received from the transmitting node. From this data table, the clock value and clock rate information can be determined by the receiver based on the transmitting node. This clock information can be used by the receiver to identify the transmitting node. The data table can further include GPS-based time values corresponding to the recorded system times.

The receiving node can record clock values of other nodes that are received in messages alongside the value of the clock of the receiving node at the time the messages are received. In this way, each node can be associated with an initial clock value, and the rate of each node’s clock can be determined when two or more messages have been received from the same node. The transmitting node’s clock rate can then be compared to the receiver node’s clock rate, and a relationship between the different clock rates can be determined. According to embodiments of the present invention, the clock value and the relationship between clock rates can be used advantageously by the receiving node to verify the identity of the transmitting node, to encrypt messages transmitted between the nodes, and to guarantee message delivery between the nodes.

Embodiments of the present invention may be performed by networks of multi-processor systems, particularly loosely coupled systems. In a loosely coupled system, each CPU or node is equal to any other, and rolls are performed arbitrarily. The real-time processing capabilities of such systems can grow linearly by adding additionally CPUs.

FIG. 1 depicts an exemplary electronic transaction 100 performed between electronic communication systems 105 and 110 for determining clock rate information of the transmitting node, e.g., clock values and a relationship between clock rates according to embodiments of the present invention. The systems 105 and 110 can be processors of different computer systems connected over the internet or a dedicated service line, for example. The systems 105 and 110 include memory and one or more clocks for tracking time The clocks can be a processor clock or a global position system (GPS) based clock, for example. According to embodiments of the present invention, the clock rate/values of one system can be used advantageously by another system to confirm the identity of the system within a computer network and to recover from crashes and downtime.

Clock values of systems 105 and 110 can be recorded in a large binary register e.g., 128 bits in length with very high resolution e.g., on the order of nanoseconds or picoseconds, which may leave spare bits that can be used for other purposes. According to some embodiments, the clock value used to confirm the identity of a system within the computer network are high-resolution values that requires a relatively high degree of similarity between an estimated clock value and a reported clock value to authorize the identity of the system. According to other embodiments, a lower resolution value can be used, for example, when transmission delay or other issues lead to unreliable or inconsistent network performance, and therefore a lower degree of similarity is acceptable. The level of similarity between the estimated clock value and the reported clock value can vary dynamically in real-time based on network conditions, for example.

In the example of FIG. 1, system 105 reads the value of its clock (clock value 115A) and contemporaneously transmits a message 120A to system 110 that includes clock value 115A. System 110 receives message 120A and records clock value 115A in a memory-resident table along with the current clock value 125A of system 110. Clock value 125A is the clock value of the receiver's clock at the time of reception of the message 120A. Clock value 125A is the clock value of the receiver's clock at the time of reception of the message 120A. The table can also include a device or network address (e.g., IP address or MAC address) associated with the device and/or a transaction ID associated with a transaction to be executed. According to some embodiments, the table is also used to store the size of each message sent to or received from another node. This process can be repeated for multiple messages with all clock values being stored in a table, and an approximate mapping between the clocks of systems 105 and 110 can be determined. From this mapping, a mathematical relationship can be determined between the clock rate information of systems 105 and 110 that have been transmitted between the systems.

In one example, after several messages are received from system 105, the clock rate of system 105 may be found to be twice as fast as the clock of system 110 (e.g., x=2y). In this case, clock value 115A=clock value 125A×2, clock value 115B=clock value 125B×2, clock value 115C=clock value 125C×2, and so on for each message 120*n*. In this way, system 110 can preliminarily identify system 105 first according to the network or device address of system 105, and can then confirm the identity of system 110 according to its determined clock rate and/or the clock value 115*n* included in any message n received from system 105 using the relationship between clock value 115*n* and clock value 125*n*.

The timing of messages transmitted over a communications network is often affected by a transmission delay. Transmission delay is roughly based on the propagation delay of the communication medium and the size of the message transmitted. Generally larger messages take longer to transmit compared to smaller messages, and propagation delay remains relatively constant. When the transmission speed is very high (e.g., 6 Gbit/s) and the propagation delay is very low (e.g., 200 ps), transmission delay can be essentially ignored for the purposes of estimating the clock value of system 110. In other cases, when transmission delay is significant, the estimated clock value 115*n* can be adjusted based on the estimated transmission delay.

In one exemplary approach, the estimated transmission delay is determined based on the size of the received message. System 110 may further adjust clock value 115*n* based on estimated network traffic conditions (e.g., queueing/switching delay) at the time the message is received. In this way, system 110 can approximate the value of clock value 115 at any given time, and messages received from a network or device address associated with system 105 can be authorized according to the approximate value, with the level of accuracy required for authorization being dynamically adjustable. According to some embodiments, the estimated transmission delay is estimated based on the distance between systems, for example, the amount of time it would take to traverse the distance at the speed of light.

Figure 2:
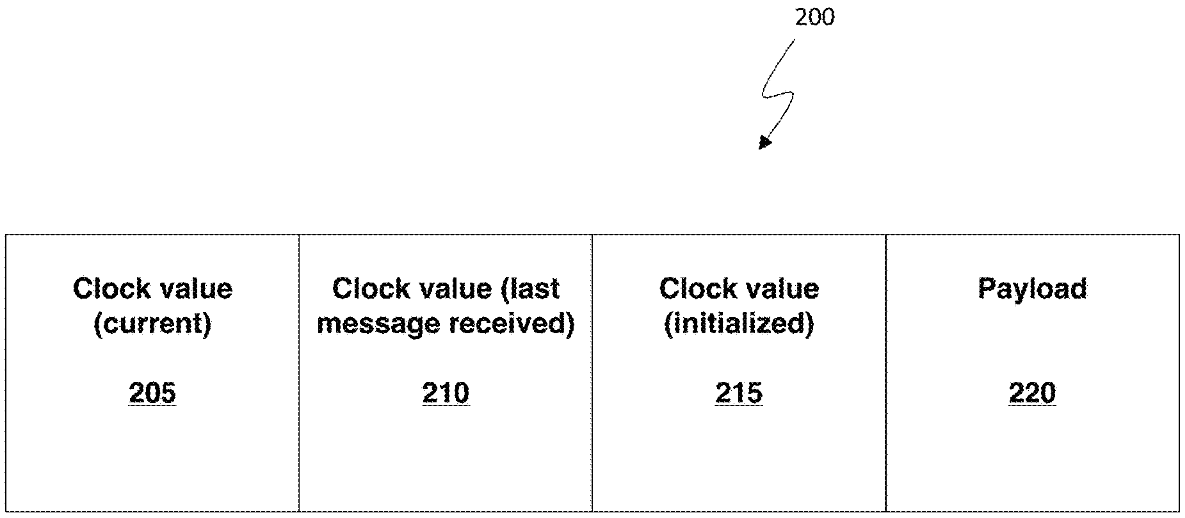
FIG. 2 depicts an exemplary message transmitted between nodes that includes a clock value for confirming the identity of a node according to embodiments of the present invention.

FIG. 2 depicts an exemplary message 200 transmitted between nodes that includes a clock value 205 for confirming the identity of the transmitting node according to embodiments of the present invention. Specifically, message 200 includes the current clock value of the transmitting node at the time message 200 is transmitted by the transmitter node (205), the clock value of the transmitting node at the time of reception of the last message received from the destination node (210), and initially the clock value of the transmitting node when the transmitting node was initialized (215). Message 200 can further include a payload 220, such as data and/or instructions for performing a transaction (e.g., a read or write operation). The clock values of message 200 can be added to a table of clock values associated with different nodes stored in the memory of the receiving device. The time values may be stored as 128-bit values, which is sufficient in most cases, as 60 bits is required to achieve an accuracy to 1⁄1000 of a femtosecond. To store values at this level of accuracy for 10 trillion years requires only 60 bits for the low order bits up to a second, and another 50 bits to store the high order bits up to 10 trillion years, with 18 bits of the 128 bits saved for expansion at the low end, for example.

Figure 3A:
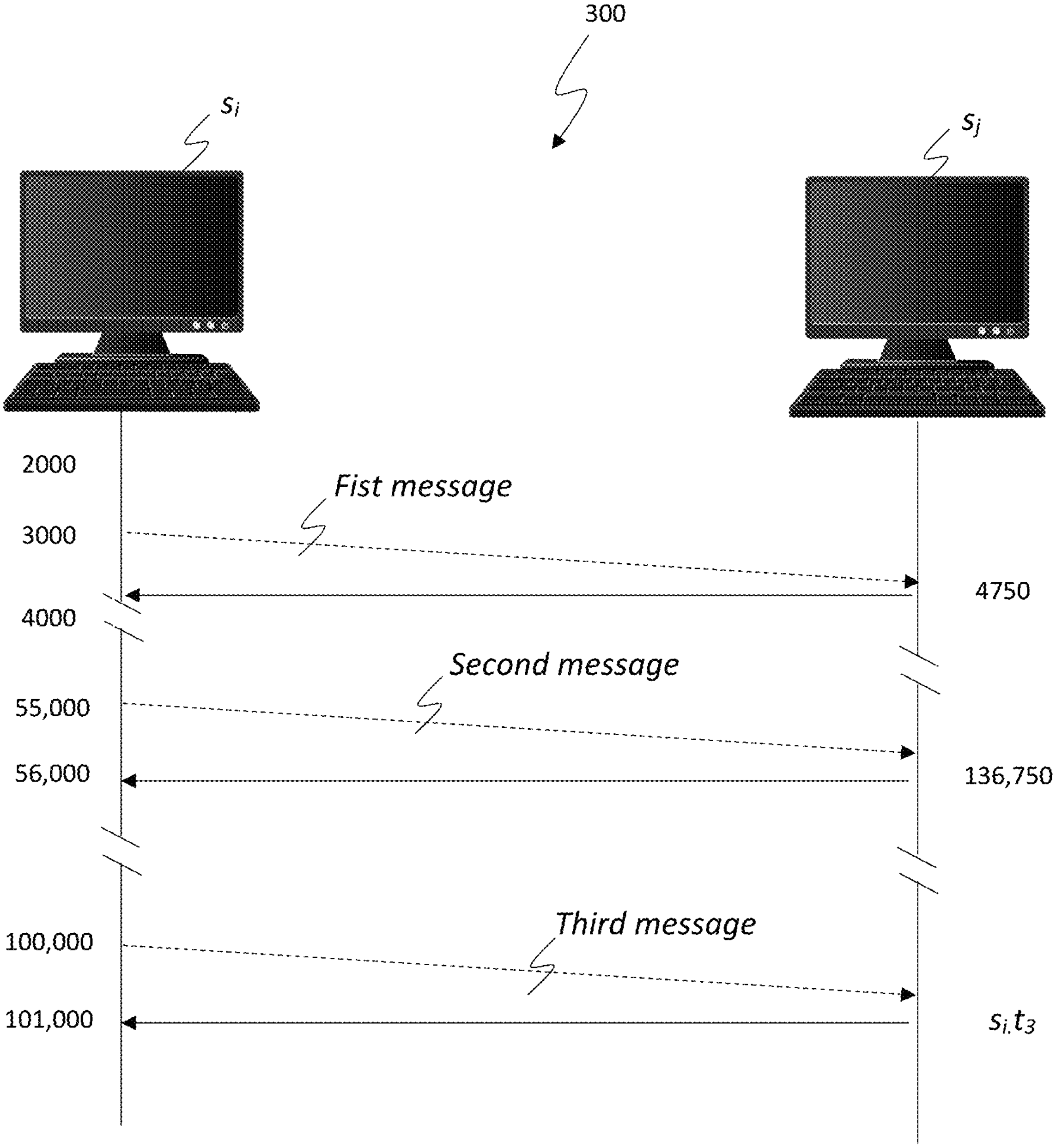
FIG. 3A is a transmission timing diagram depicting exemplary communications for performing system initialization and confirming the identify of a node in a multiprocessor system or computer network according to embodiments of the present invention.

FIG. 3A is a transmission timing diagram depicting exemplary communications 300 for performing system initialization and confirming the identify of a device of a communications network, or a node of a real-time computer network according to embodiments of the present invention.

In the example of FIG. 3A, system $s_i$ comes online and reads its initialized clock value $s_i.t_0$ which is 2000 ticks. This clock value is typically recorded in a large binary register e.g., 128-512 bits in length with very high resolution e.g., on the order of nanoseconds or picoseconds. Later, when the value of $s_1.t_1$ is 3000 ticks, system $s_i$ transmits a message (e.g., an initialization request) to system $s_j$. The message includes the clock value of system $s_i.t_1$ (3000 ticks) at the time of transmission. According to some embodiments, the message also includes the clock value of system $s_i$ when it first came online $s_i.t_0$ (2000 ticks) and/or a network or device address associated with system $s_i$.

System $s_j$ receives the message from system $s_i$ when the clock value $s_j.t_1$ is equal to 4750 ticks. This is the value of the receiver's clock at the time of reception, $t_1$. System $s_j$ transmits a reply to the message received from system $s_i$ that includes the value $s_j.t_1$.

System $s_i$ later transmits a second message to system $s_j$ when the clock value $s_i.t_2$ is equal to 55,000 ticks which is the value of the clock of $s_i$ at the time the second message is sent. The second message includes the clock value of system $s_i.t_2$ (55,000 ticks). According to some embodiments, the message also includes the clock value of system $s_i$ when it first came online $s_i.t_0$ (2000 ticks) and/or a network or device address associated with system $s_i$. This step can be performed after initialization or during re-establishment following a crash.

System $s_j$ receives the second message from system $s_i$ when the clock value $s_j.t_2$ is equal to (136,750 ticks). This is the value of the receiver's clock at the time the second message is received. System $s_j$ transmits a reply to the message received from system $s_i$ that includes the value $s_j.t_2$.

System $s_i$ later transmits a third message to system $s_j$ when the clock value $s_i.t_3$ is equal to 100,000 ticks. This is receiver's clock value at the time of reception. The message includes the clock value of system $s_i.t_3$ (55,000 ticks). According to some embodiments, the message also includes the clock value of system $s_i$ when it first came online $s_i.t_0$ (2000 ticks) and/or a network or device address associated with system $s_i$.

System $s_j$ receives the third message from system $s_i$ when the clock value $s_j.t_3$ is equal to (251,130 ticks). System $s_j$ transmits a reply to the message received from system $s_i$ that includes the value $s_j.t_3$. Si can confirm the identify of system $s_j$ by confirming that the value $s_j.t_2$ is approximately equal to its estimated value of $s_j.t_3$. The estimated value of $s_j.t_3$ can be computed by system $s_i$ according to the clock rate determined from the prior messages as described below in Equation I:

$$sj.t3 = \frac{(sj.t2 - sj.t1)}{(si.t2 - si.t1)} \cdot (si.t3 - si.t1) + sj.t1 \qquad \text{Equation I}$$

In the example of FIG. 3A, the ratio $$\frac{(sj.t2 - sj.t1)}{(si.t2 - si.t1)}$$

is computed as:

$$\frac{136{,}750 - 4750}{55{,}000 - 3000} = \frac{132{,}000132}{52{,}000} = 2.538.$$

Applied to Equation I, $s_j.t_3$=2.538 (100,000−3000)+4750=246,186. Accordingly, system $s_i$ can confirm the identity of system $s_j$ according to the reported clock time $s_j.t_3$ when system $s_j$ received the third message transmitted by system $s_i$. In other words, the receiver can use its clock value at the time of message reception and the computer-rate relationship between the sender's clock and the receiver's clock to computer an expected time value of the sender's clock at the time of message transmission. This expected clock value can be compared to the value of the sender's clock as reported in the sender's communication. If the values match with an agreed threshold, then the identity of the sender can be authenticated. In the given example, if the clock time $s_j.t_3$ is substantially similar to the value of $s_j.t_3$ estimated using Equation I, then the identity of system $s_j$ is considered confirmed/authorized. Otherwise, the third message is considered unauthorized. Moreover, the requisite threshold of similarity between the estimated value and the reported value can be adjusted in real-time.

FIG. 3B is a diagram depicting an exemplary memory-resident data structure for storing clock values used to authorize a party to an electronic transaction according to embodiments of the present invention. Data structure 350 is stored in a memory of computer system $s_i$ and includes the clock value when system $s_i$ first booted and times $t_1$, $t_2$, and $t_3$ associated with the respective messages transmitted in FIG. 3A. Data structure 350 stores clock values associated with each message transmitted between system $s_i$ and $s_j$. In the example of FIG. 3B, system $s_i$ stores the clock value of system $s_i$ when a message is transmitted by system $s_i$ and the clock value of system $s_j$ when the message is received by system $s_j$. Based on the clock values stored in data structure 350, system $s_i$ can compute an estimated clock value $s_j.t_3$ as described herein according to embodiments of the present invention, which can be used to authorize system $s_j$ to execute a transaction between system $s_i$ and $s_j$.

Secure Message Delivery Between Computer Systems

Embodiment of the present invention provide an approach to message delivery between remote parties to an electronic communication or transaction based on processor characteristics (e.g., clock rates) that can ensure that a transaction is complete with a high degree of accuracy. Typically the identity of the parties is confirmed before the transaction takes place according to clock rates of the parties, and messages transmitted between the parties may be encrypted using the processor characteristics. The transaction involves modifying the local database of a computer system, and embodiments of the present invention can track the status of the transaction until the transaction is known by all parties to be fully complete. In particular, the transaction may be carried out by a processing logical element (PROLE), which can be a computer system of any number of processing nodes under the control of a single instance or copy of an operating system, such as a master control system (MPC). The operating system can typically arbitrarily recover data under its control to any previous state ("rollback") based on individual audited transactions. The rollback or state change is typically performed at a precise time and may be coordinated between multiple computer systems using a coordinator system to avoid conflicting data or corruption of the database. Typically each computer system under control of the operating system includes a single clock, which operates to count the CPU cycles of the root CPU used by the operating system. The clock can be considered the "system clock," which indicates the "system time" of the operating system, and the system time can be translated to another time keeping system, such as GPS time.

Each PROLE can be a computer system with a loosely coupled hardware and software architecture that executes a message-based OS that allows for scalability within a single system. The number of transactions per second that a PROLE can execute is proportional to the number of processors managed by the PROLE. The loss of a component, such as a communication line, hard drive, disk, or processor, can be dealt with by the PROLE transparently without significant impact to performance. In cases where entire systems are made unavailable temporarily, such as during a power failure, the PROLE can recover the system exactly on restart, and any incomplete transactions will be backed out. In more extreme cases, where an entire system is lost forever (e.g., an explosion or natural disaster), peer computers systems within a real time network can recover the lost or damaged PROLE.

As described above with respect to FIG. 3, a system $s_i$ can confirm the identity of another system $s_j$ according to a reported clock time $s_j.t_3$ when system $s_j$ receives the third message transmitted by system $s_i$. In this way, the receiver can use its clock value at the time of message reception and the computer-rate relationship between the sender's clock and the receiver's clock to computer an expected time value of the sender's clock at the time of message transmission. Importantly, $s_n.t_n$ are unique in space-time for any location $L_n$. It is also known that no two computer systems may occupy the same space (Pauli exclusion principle); no two computer clocks can experience the same gravitational force; no two computer clocks can have the same clock rate; and all events which alter a local database of a computer system occur at a unique time and place ∀ T{si} that apply only to si's local database. Therefore, it is true that for a transaction $T_{id}$, given a processor clock time $t_i$, the state of any number of systems n can be represented as:

$$T_{id}, [T\{s_n\} * (s_i, s_j)] = (s_i', s_j')@ \geq t_i$$

In the event of a crash that requires recovery to a prior state, the transaction $T_{id}$, can be rolled back by taking the integral of the transaction. The rollback transaction $T_{id}$, can be represented as:

$$\text{T\_id}, \left[\int T\{s_n\} * (s_i', s_j')\right] = (s_i, s_j)@ \geq t_i$$

According to some embodiments, the PROLES are responsible for auditing and/or maintaining database integrity. For example, the local operating system can use tools including atomic transactions, record locking, and before-image auditing to provide database integrity on the local PROLE, no matter what level of crash occurs. The same audit trails providing crash recovery can also provide functions for historical re-creation (rollback) of a prior state. In other words, the state of the database at any time in the past can be re-created at any time in the future. Typically the PROLE tracks time according to the Master Control Program (MCP)/OS root processor clock as discussed above and detailed in the related documents JDAY-0001-01.01 and JDAY-0002-01.01 references above.

In general, all transactions/events associated with the system (PROLE) occur at a specific clock tick ($s_n$, $t_n$, PROLE @$L_n$). Any clock time can be converted at any time to another time system, such as GPS time, where $\forall$ $s_n.t_n$, $s_n.t_n$ ≡(GPS of)$L_n$ ≡f($L_n$).

Figure 4:
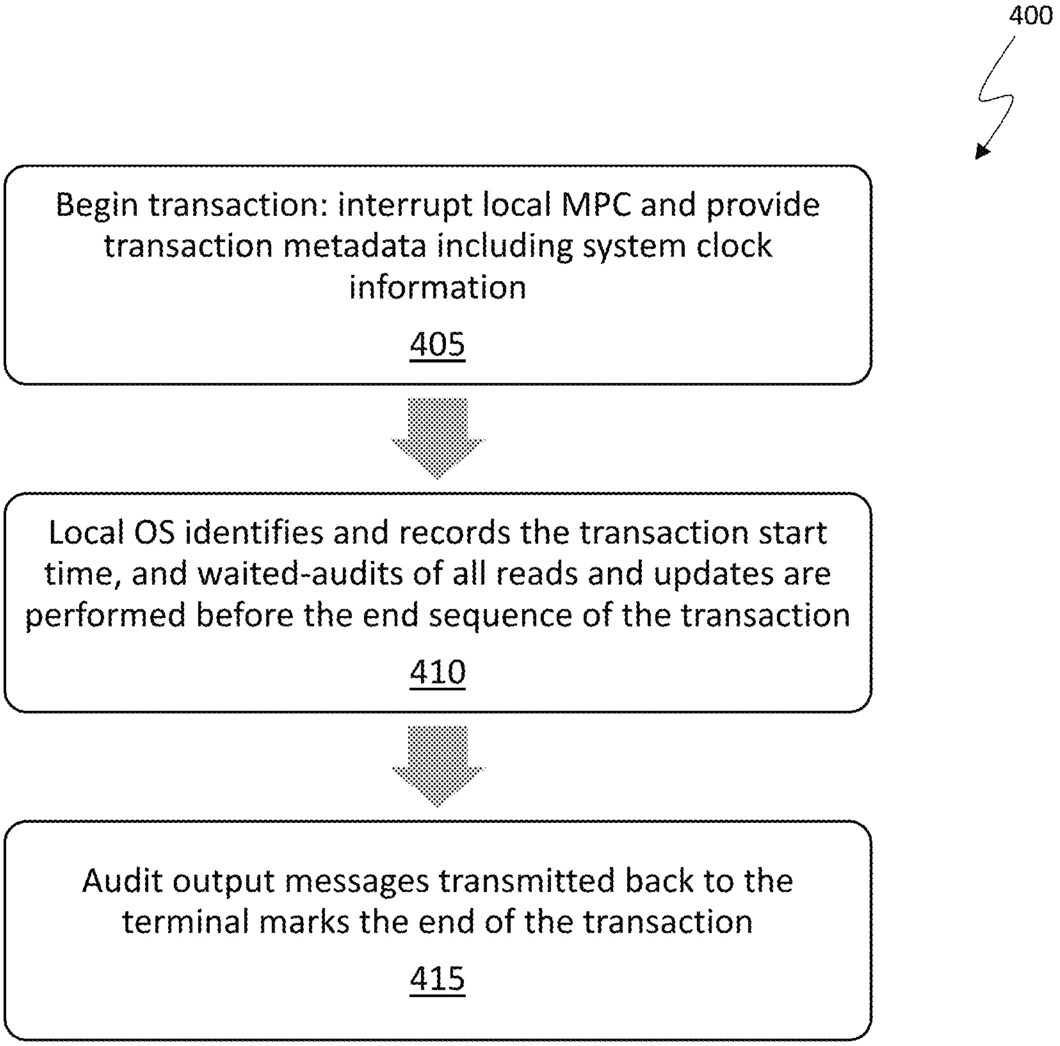
FIG. 4 is a flowchart depicting computer implemented steps of a process for electronic message delivery between remote computer systems according to embodiments of the present invention.

FIG. 4 depicts an exemplary sequence of computer implemented steps of a process 400 for electronic message delivery between remote computer systems according to embodiments of the present invention. In the exemplary transaction of FIG. 4, at step 405, an application executed by a computer system receives input from a terminal and begins the transaction at a specific time ("human time") as determined by a time keeping system, such as a GPS system. The application interrupts the local OS (e.g., MPC) in response to the terminal input and provides the related transaction metadata including system clock information at this time. At step 410, the local OS identifies and records the transaction start time, and waited-audits of all reads and updates are performed before the end sequence of the transaction. At step 415, the audit output messages transmitted back to the terminal marks the end of the transaction.

Typically a transaction is any activity that causes a change in the database from one state to another. Specifically, only audited transactions may alter the state of the database. As mentioned above, the events of a transaction are unique in time and space $s_n$, $t_n$. The state of a network system after a transaction T can be represented as:

$$T(\ ) * (s_i, s_j) = (s_i', s_j') = T(\ ) * s_i + T(\ ) * s_j$$

Transaction T can be rolled back by transaction ∫T( ):

$$\int T(\ ) * (s_i', s_j') = (s_i, s_j) = \int T(\ ) * s_i' + \int T(\ ) * s_j'$$

Figure 5:
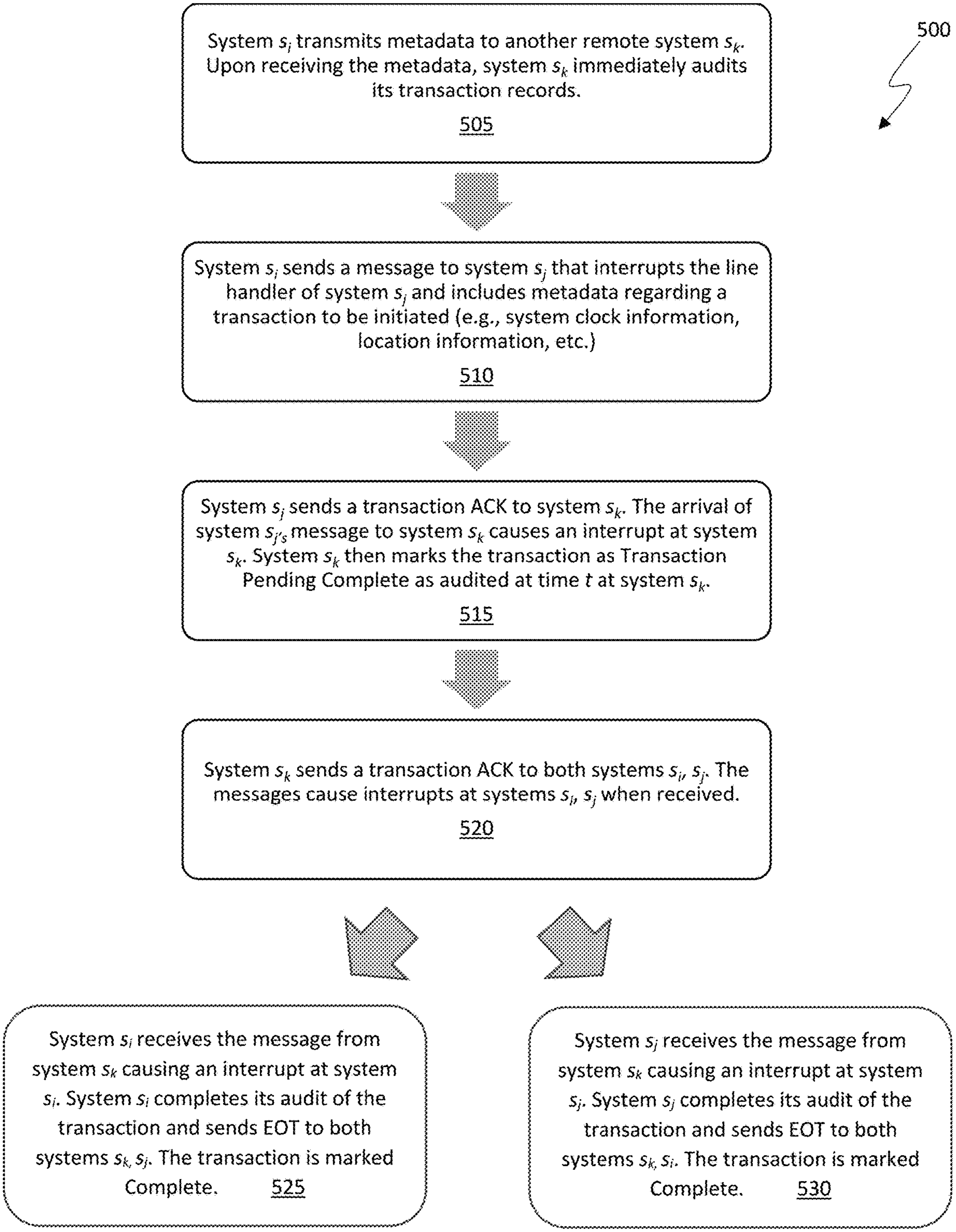
FIG. 5 is a flowchart depicting computer implemented steps of a process for performing an electronic transaction to modify one or more databases via remote electronic messages according to embodiments of the present invention.

FIG. 5 depicts an exemplary sequence of computer implemented steps of a process 500 for performing an electronic transaction to modify one or more databases via remote electronic messages according to embodiments of the present invention. Prior to the execution of process 500, it is assumed that records on both remote systems $s_i$ and $s_j$ are locked, and that the transactions of $s_i$ and $s_j$ have been audited. The identity of the parties to the transaction can be authenticated based on system clock information (e.g., clock rate) as described in the above-referenced document JDAY-0001-01.01. Moreover, the messages can be encrypted and decrypted according to the teachings of JDAY-0002-01.01 also referenced above. Typically, the transaction involves accessing records on system $s_i$ and/or system $s_j$, and making modifications to those records. The modifications require locking records prior to the transaction and unlocking records after the transaction is complete. It is important that both systems $s_i$, $s_j$ are able to recover from a crash at any point during the transaction, and that they are able to indicate that the transaction has been completed with an extremely high level of accuracy. According to some embodiments, crashes are automatically detected and crash recovery procedures can be executed at any time.

In steps 505-530, any step that includes receiving a message from a remote computer system can include comparing the arrival time of the message to an estimated arrival time of the message calculated based on a known clock rate of the transmitting system. If the message is not delivered within a threshold time compared to the calculated arrival time, the message can be considered invalid. Steps for determining if a received message is valid based on system clock time are described in the above-referenced document JDAY-0001-01.01.

At step 505, system $s_i$ also transmits metadata to another remote system $s_k$. System $s_k$ is not a direct party to the transaction but rather intermediates and facilitates the transaction between system $s_i$, $s_j$. Upon receiving the metadata, system $s_k$ immediately audits its transaction records.

At step 510, the operating system of system $s_i$ sends a message to system $s_j$ that interrupts the line handler of system $s_j$ and includes metadata regarding a transaction to be initiated (e.g., system clock information, location information, etc.). At this time system $s_j$ can perform a cyclic redundancy check (CRC) on the message received from system $s_i$ and can optionally transmit a message acknowledgment (ACK) to system $s_j$. During step 505, both systems $s_i$, $s_j$ are in an Incomplete state (indicating that the transaction has not yet completed).

At step 515, after all audits have been completed (waited I/O), system $s_j$ sends a transaction ACK to system $s_k$. System $s_i$ may be considered to have sent an ACK by implication during step 505. The arrival of system $s_{j's}$ message to system $s_k$ causes an interrupt at system $s_k$. System $s_k$ then marks the transaction as Transaction Pending Complete as audited at time t at system $s_k$. During step 515, both systems $s_i$, $s_j$ remain in an Incomplete state (indicating that the transaction has not yet completed).

Table I shows the state of the transaction from the perspective of systems $s_i$, $s_j$, and $s_k$ after step 515:

TABLE I

| System | $s_i$ | $s_k$ | $s_j$ |
|---|---|---|---|
| Transaction State | Incomplete | Pending Complete | Incomplete |

At step 520, as close together as possible, system $s_k$ sends a transaction ACK to both systems $s_i$, $s_j$. Moreover, transaction ACKs can be sent to any (n−1) participants in the transaction, according to some embodiments. Once received, the messages cause interrupts at systems $s_i$, $s_j$.

At step 525, system $s_i$ receives the message from system $s_k$ causing an interrupt at system $s_i$. System $s_i$ completes its audit of the transaction (waited). System $s_i$ then sends an End of Transaction (EOT) message to both systems $s_k$, $s_j$. The EOT includes metadata (e.g., system clock information) that can be used to verify the message. At this time, system $s_i$ marks the transaction as Complete.

At step 530, system $s_j$ receives the message from system $s_k$ causing an interrupt at system $s_j$. System $s_j$ completes its audit of the transaction (waited). System $s_j$ then an End of Transaction (EOT) message to both systems $s_k$, $s_i$. The EOT includes metadata (e.g., system clock information) that can be used to verify the message. At this time, system $s_j$ marks the transaction as Complete.

The transaction audit performed by system $s_k$ is complete whenever it receives an EOT from system $s_i$ or system $s_j$. The transaction is considered complete as of the time of Transaction Pending Complete at system $s_k$ (step 515). In this way, all parties $s_i$, $s_j$, and $s_k$ know that the transaction has completed successfully.

In the case of a crash, at any given processor clock time $t_k$, the state of systems $s_i$, $s_j$ can be reset to a prior state depending on the time of the crash. For any given transaction at time $T_x$, $\{\forall s_i, s_j, s_k \in, \forall Tx\ (i,j,k) \rightarrow T'x(i,j,k)\}$. In particular, the transaction $T_{id}$, $[T\{s_n\}^*(s_i,\ s_j)]=(s_i,\ s_j)@\geq t_k$ can be re-stated according to $T_{id}$, $[\{s_n\}^*(s'_i, s_j')]=(s_i, s_j)@<t_k$. If the crash occurs before time $t_k$, then the states of $s_i$, $s_j$ will be re-stated to the prior state. If the crash occurs after $t_k$, then the state $s'_i$, $s'_j$ will be the state. Since $\forall$ sn, both $s_i$ and $s_j$ are known before time $t_k$, $s_i$ can be restored or left as $s'_i$ following crash recovery at time$>t_k$.

According to some embodiments, the metadata included in each message is received by an artificial intelligence (AI) module that analyzes the metadata to help verify messages received between systems. For example, all prior messages between systems can be analyzed by the AI module using a learned language model (LLM), a neural net, machine learning algorithms, or the like, to identify relationships between systems, locations, and clock times/clock rates. In this way, messages subsequently transmitted between these systems (and metadata thereof) can be used to confirm the identify the identity of the parties, encryption/decryption information (e.g., encryption/decryption keys), and transaction status (e.g., incomplete, pending complete, complete) according to threshold values defined by the AI module (e.g., estimated arrival time based on clock rate compared to actual arrival time). Successful and unsuccessful transactions can be identified and fed back to the AI algorithm as part of the training data that is used to define the threshold values. Clock values/rates can also be compared to GPS time systems or the like by the AI module to determine relationships between clock rates and other time sources. This relationship can be used for the determination of encryption/decryption information, transaction status, and party identification, for example.

Exemplary Computer System

Embodiments of the present invention are drawn to computer systems that can deliver messages relating to an electronic transaction between remote computer systems, and can ensure that the transaction has been completed with a high degree of accuracy. The following discussion describes such exemplary computer systems.

Figure 6:
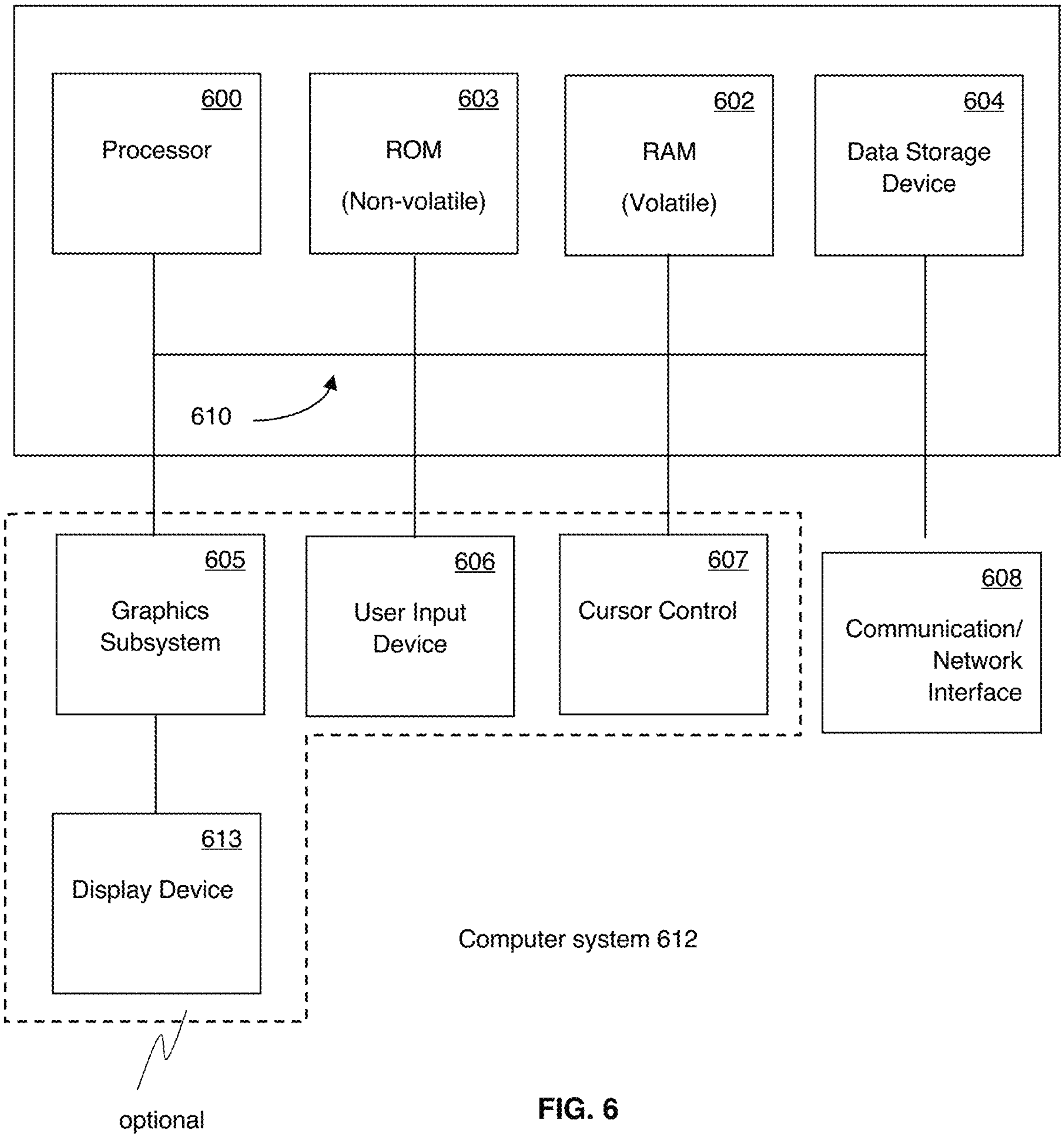
FIG. 6 is a block diagram of an exemplary computer system upon which embodiments of the present invention may be implemented.

In the example of FIG. 6, the exemplary computer system 612 includes one or more central processing unit (s) 601 for running software applications and optionally an operating system=. Computer 612 can be a personal computer or a node of a multiprocessor system for example. Random access memory 602 and read-only memory 603 store applications and data for use by the CPU 601. Data storage device 604 provides non-volatile storage for applications and data and may include fixed disk drives, removable disk drives, flash memory devices, and CD-ROM, DVD-ROM or other optical storage devices. The optional user inputs 606 and 607 comprise devices that communicate inputs from one or more users to the computer system 612 (e.g., mice, joysticks, cameras, touch screens, and/or microphones). According to some embodiments, computer system 612 is a loosely coupled system and includes multiple CPUs 601.

A communication or network interface 608 allows the computer system 612 to communicate with other computer systems, networks, or devices via an electronic communications network, including wired and/or wireless communication and including an Intranet or the Internet. Communication or network interface 608 can include fast interconnects for communications between nodes. The display device 613 (optional) may be any device capable of displaying visual information in response to a signal from the computer system 612. The components of the computer system 612, including the CPU 601, memory 602/603, data storage 604, user input devices 606, and graphics subsystem 605 may be coupled via one or more data buses 610. Further embodiments of system 612 include a GPS or atomic clock interface. According to some embodiments, CPU 601 is a programmable data communication processor.

Figure 7:
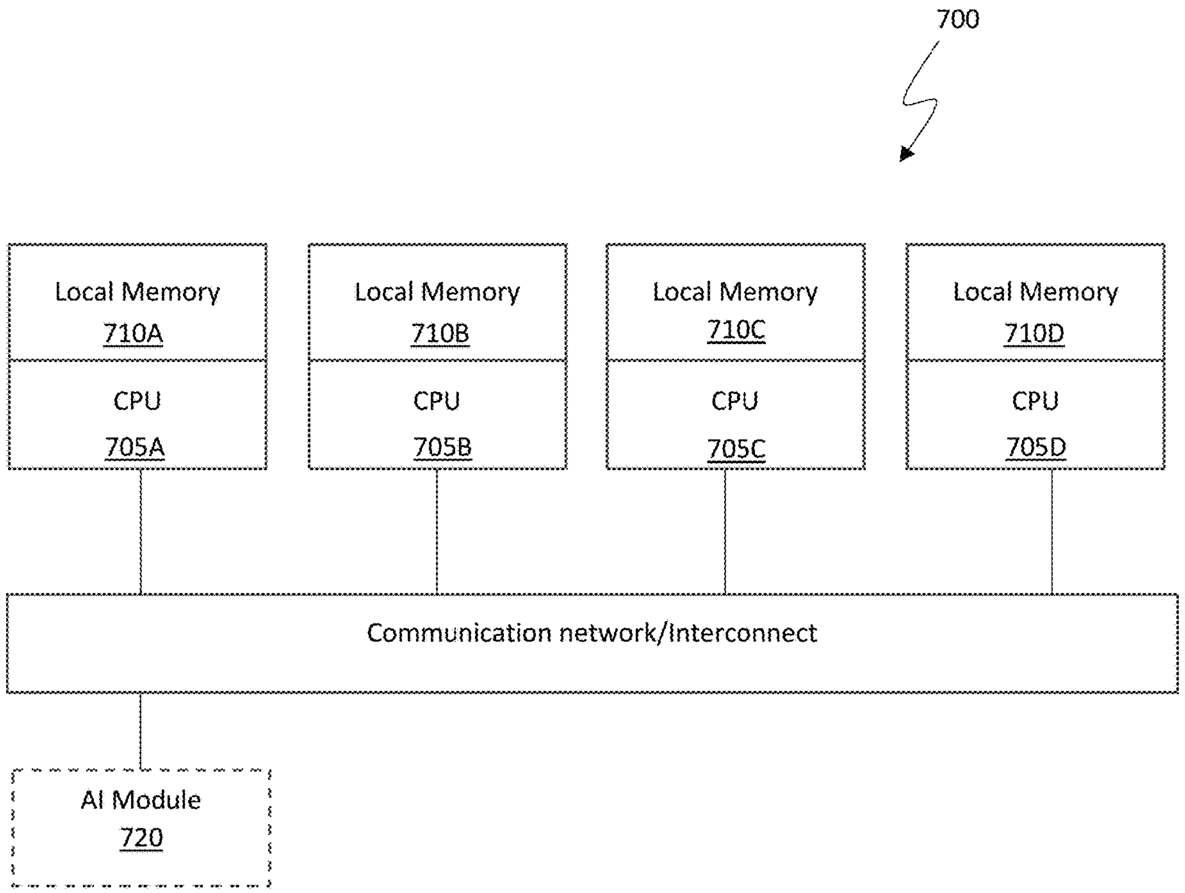
FIG. 7 is a block diagram depicting an exemplary multiprocessor system (e.g., a loosely coupled multi-processor system) upon which embodiments of the present invention may be implemented.

FIG. 7 depicts an exemplary loosely coupled or distributed multi-processor network of systems 700 that can uniquely identify parties to transactions and encrypt messages based on clock values according to embodiments of the present invention to ensure message delivery with high accuracy. Each CPU 705A, 705B, 705C, and 705D is coupled to communication network or interconnect 715 and includes its own respective local memory 710A, 710B, 710C, and 710D. The CPUs can be configured to perform rolls arbitrarily and each CPU is considered equal to each other (e.g., equal resource allocation, priority, etc.), and the real-time processing capabilities of system 700 can grow linearly by adding additionally CPUs. Each CPU can further include a channel and arbitrator switch (CAS) to communicate over communication network 715, as well as one or more input/output device. Communication network 715 can be a message transfer system (MTS), for example. The CPUs 705A, 705B, 705C, and 705D can be further coupled to a GPS or atomic clock interface. According to some embodiments, system 700 further includes an optional AI module 720 specifically for determining GPS time to the accuracy of the system clock, and AI module 720 can include its own dedicated processors and memory.

Exemplary Message Delivery Process Using Clock Rates in a Network Environment

Embodiments of the present invention provide distributed, real-time digital computing systems for any application that involves message delivery between devices.

Figure 8:
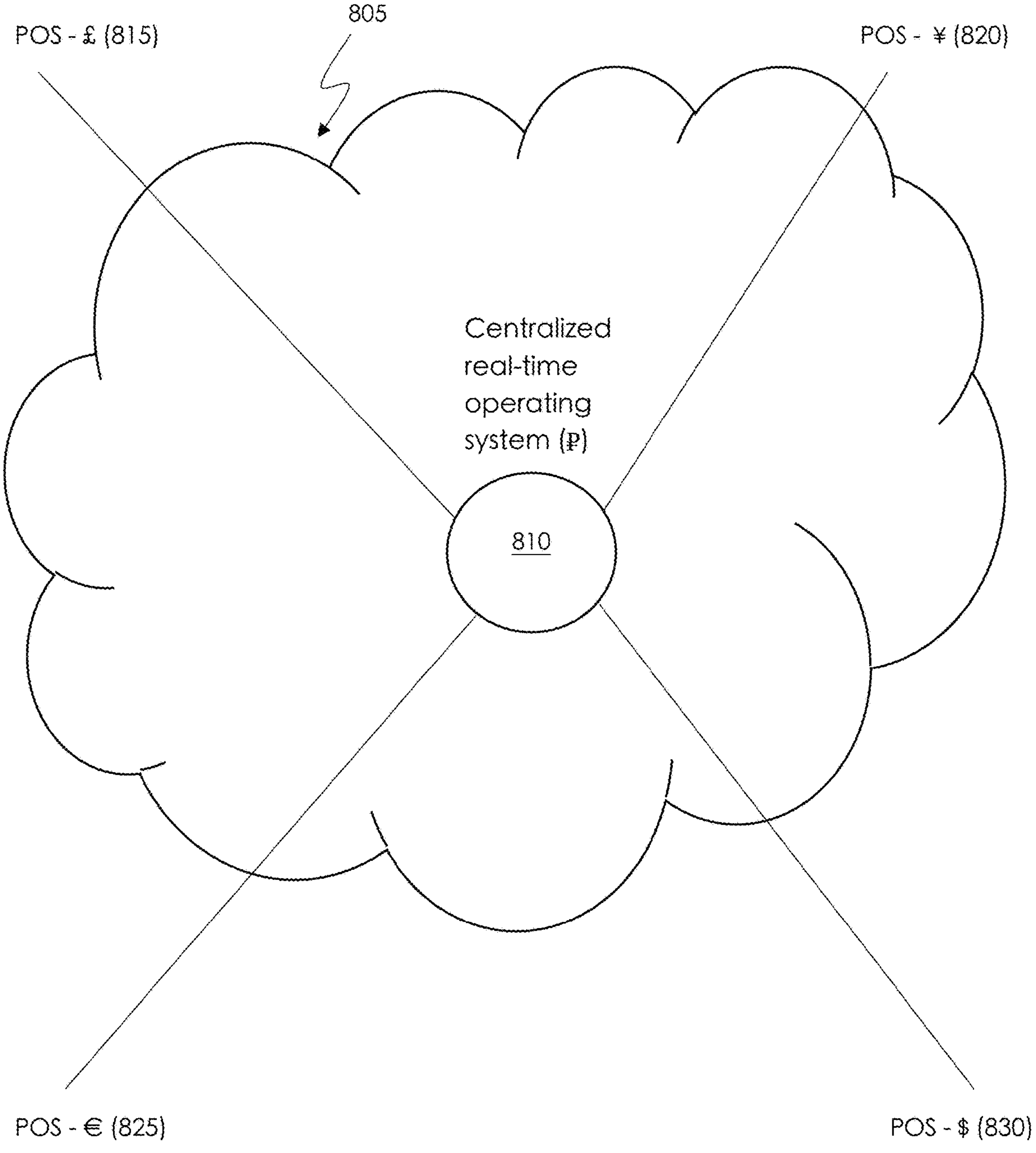
FIG. 8 depicts an exemplary centralized computer system network including a central node executing a real-time operating system according to embodiments of the present invention.

FIG. 8 depicts an exemplary centralized computer system network 805 including a central node 810 executing a real-time operating system according to embodiments of the present invention. Node 810 communicates with point of sale (POS) nodes 815, 820, 825, and 830. Each POS node transacts using a different currency, such as euros, dollars, pounds, yen, or rubles. The exemplary architecture of FIG. 8 can be used to implement embodiments of the present invention for authenticating parties based on clock rate to perform secure transactions between remote parties. However, this exemplary architecture may be difficult to scale in some situations, for example, when a relatively large number of processors is required (e.g., exceeding the number of transactions per second). Moreover, centralized real-time systems may suffer from latency and delays in response time. The crash recovery process for centralized real-time systems is also difficult and resource intensive.

Figure 9:
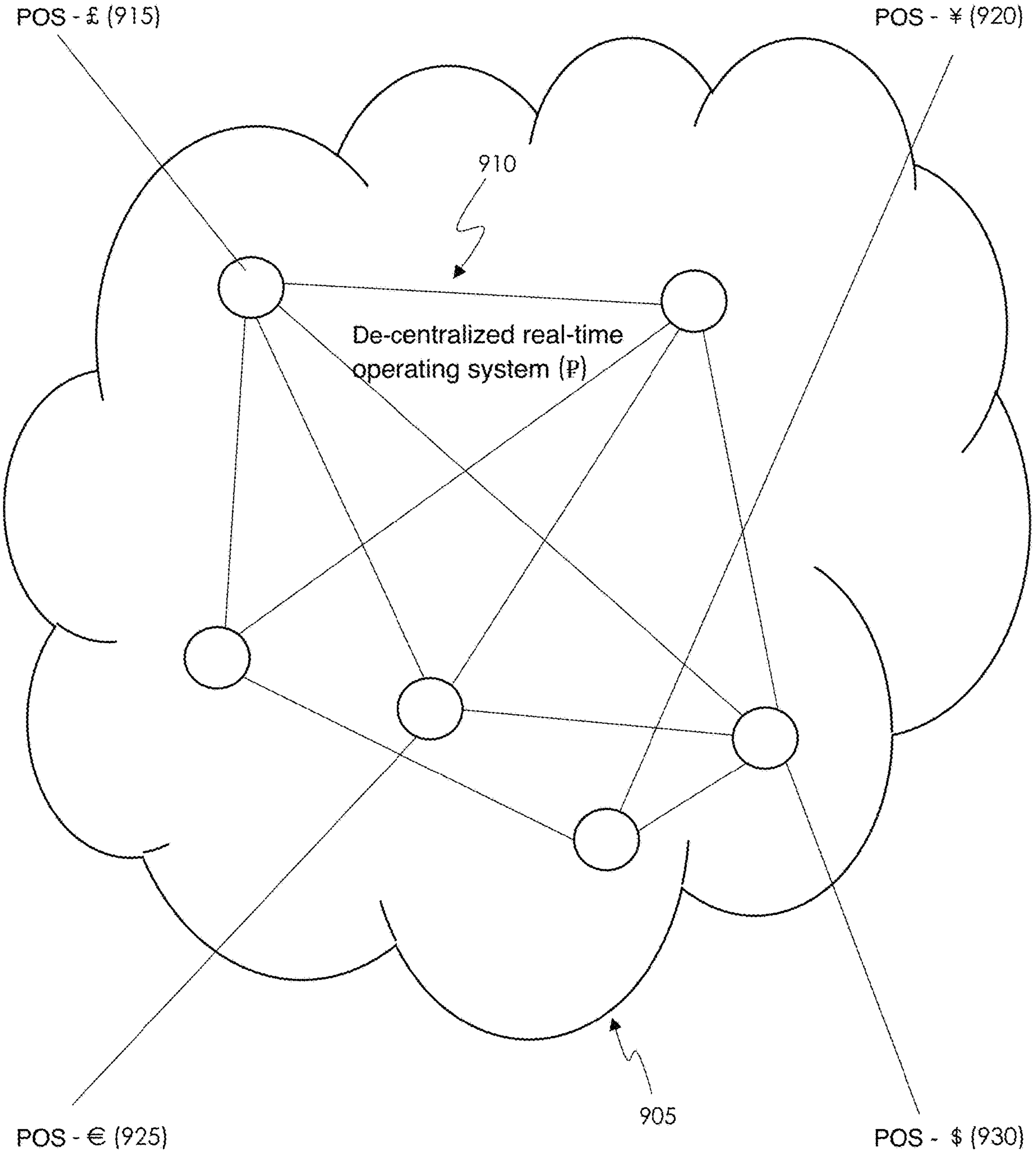
FIG. 9 is a block diagram depicting an exemplary distributed real-time operating system for providing guaranteed message delivery between parties to a transaction over a network according to embodiments of the present invention.

In order to maintain scalability and efficient crash recoverability, a distributed real-time system should be implemented as depicted in FIG. 9. FIG. 9 depicts an exemplary distributed real-time operating system 910 for providing guaranteed message delivery between parties to a transaction over a network 905 according to embodiments of the present invention. The nodes 915, 920, 925, and 930 of network 900 can include:

1. Multiprocessor, loosely coupled hardware;
2. GPS or atomic clock interface;
3. Equal peer operating system (e.g., Burroughs MCP) for scalability including a loosely coupled architecture for application transactions (e.g., using a requestor-server transaction model); and
4. A programmable data communications processor.

The programmable data communications processor sits between the network 905 and the distributed real-time operating system 910 and receives messages from network 905 during transactions. The messages received by system 910 can be transformed to system messages to be passed to a particular process so that the message can be successfully transmitted on network 905. The data communication processor can access and transmit a clock time and generate check sums for performing the guaranteed message delivery protocols described above, as described further above.

Figure 10:
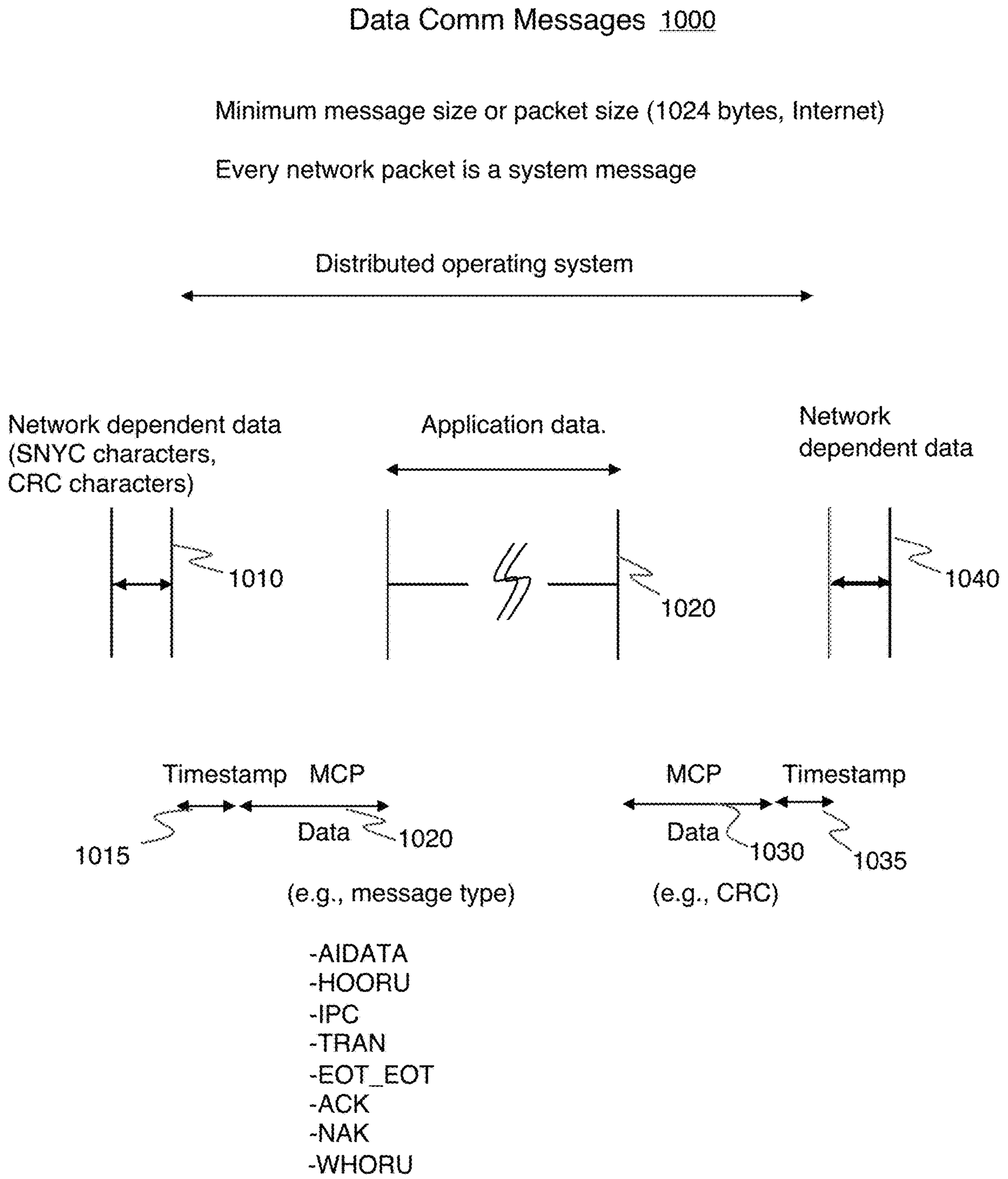
FIG. 10 is a block diagram depicting exemplary data communications messages transmitted by a distributed operating system for executing a transaction (e.g., a financial trade, purchase, or other transaction) according to embodiments of the present invention.

FIG. 10 depicts exemplary data communications messages 1000 transmitted by a distributed operating system for executing a transaction (e.g., a financial trade, purchase, or other transaction) according to embodiments of the present invention. As depicted in FIG. 10, network dependent data 1010 is transmitted from a node or POS for performing an electronic transaction and can include synchronization data, CRC data, etc. The message includes a transmit timestamp 1015 and data 1020 written by distributed operating system 1005 (e.g., MCP). Application data 1025 is followed by data 1030 (e.g., CRC data) and a receive timestamp 1035. As described above, the parties to the electronic transaction can be authenticated according to clock data associated with the transmit timestamp 1015 and receive timestamp 1035, and messages 1000 can be encrypted and decrypted based on these values. Additional network dependent data 1040 (e.g., SYNC data) is then transmitted to end the message. Messages 1000 can include different types of messages, such as AIDATA, HOORU, IPC, TRAN, EOT_EOT, ACK, NACK, WHORU, etc. The messages can be used to perform guaranteed message delivery as described in detail above.

According to some embodiments, every message transmitted is a system message, and the maximum message size is 1024 total bytes.

According to some embodiments, the messages are transmitted over the Internet. According to other embodiments, the messages are transmitted over leased telephone lines.

Figure 11A:
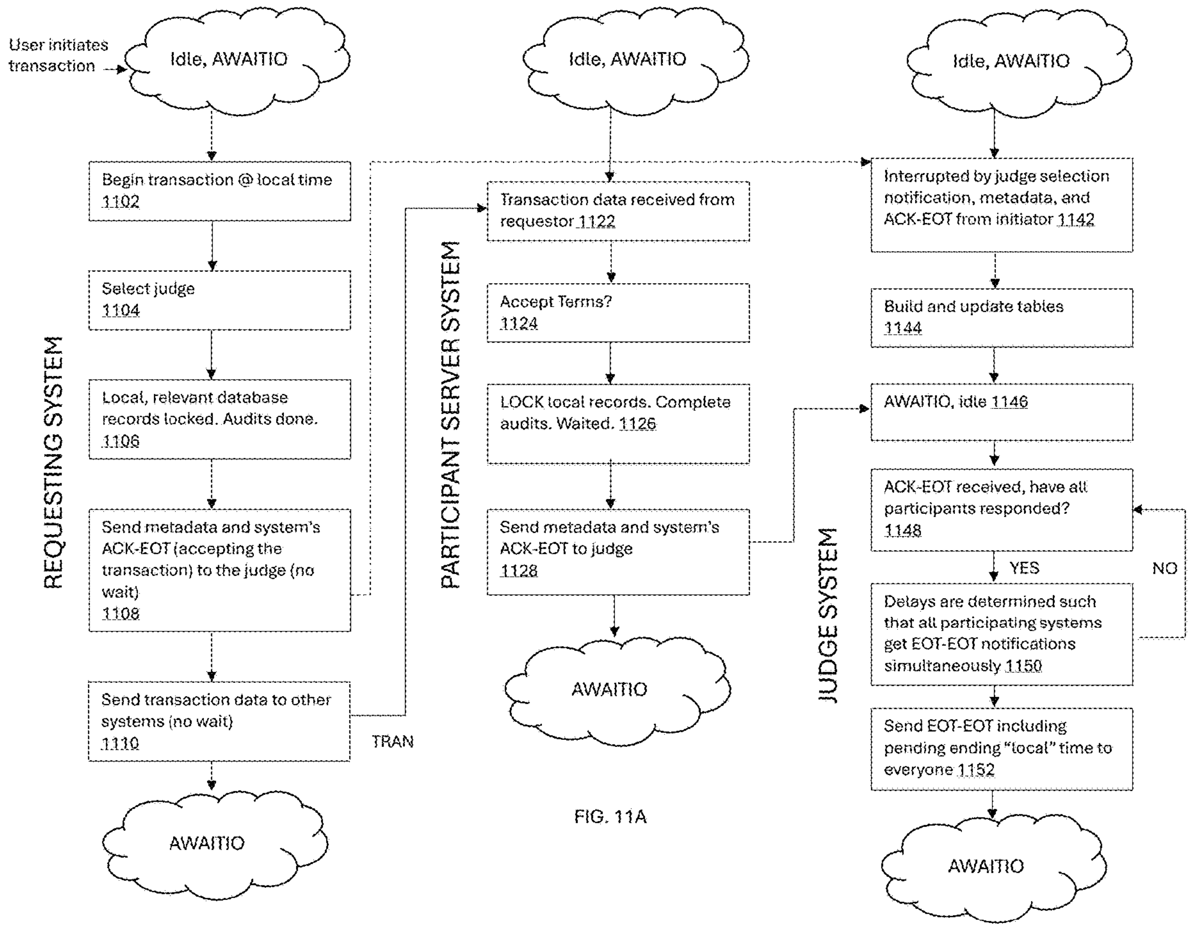
FIGS. 11A and 11B are flowcharts depicting steps of an exemplary network transaction involving multiple participants utilizing guaranteed message delivery protocols described herein according to embodiments of the present invention.
Figure 11B:
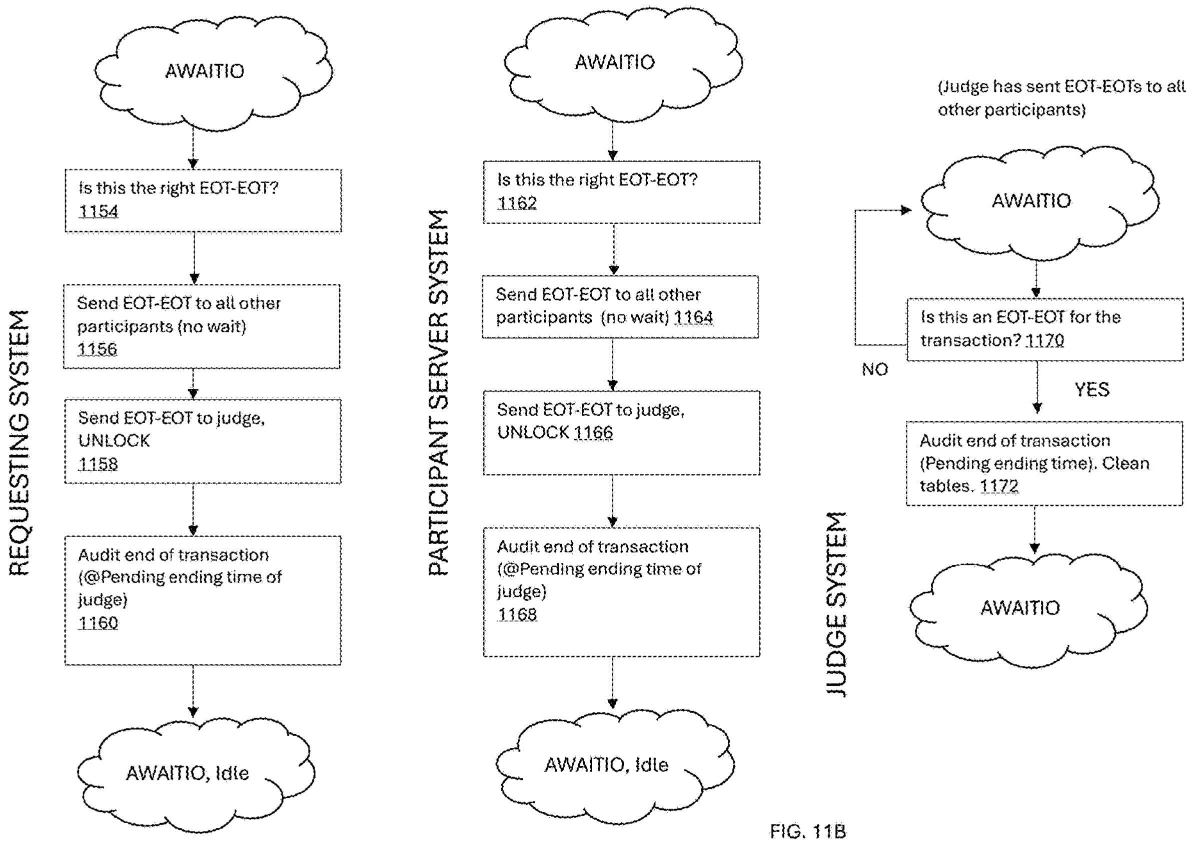

FIGS. 11A and 11B are flowcharts depicting steps of an exemplary network transaction 1100 involving multiple participants utilizing guaranteed message delivery protocols described herein according to embodiments of the present invention. The guaranteed message delivery protocols can be guaranteed at the application level such that the transaction occurs either at all systems involved or none of the systems. In other words, in no case can parties to the transaction disagree on the electronic state of the transaction, even under crash conditions. In the example of FIG. 11, a requesting system initiates a transaction with a participant server system, using a judge system as an intermediary to track the electronic state of the transaction.

The transaction 1100 described in FIG. 11 can be initiated arbitrarily and the roles of the parties (e.g., requesting system, participant server system, and judge) can be determined in real time by transaction 1100. The roles of the parties may change after the transaction. For example, the next transaction may involve the same parties in different roles. Transaction 1100 begins when a user initiates a transaction at an idle system (AWAITIO).

At step 1102 of FIG. 11A, the transaction beings at a specific local time determined by the requesting system.

At step 1104, a judge system ("judge") is selected from a group of available nodes within the network. The judge is typically a disinterested party (not a party to the transaction) that operates to determine and track the state of the electronic transaction 1100 based on messages transmitted between the parties.

At step 1106, local, relevant database records are locked by the requesting system and audits (e.g., account or transaction audits) are completed.

At step 1108, the requesting system transmits metadata and an ACK-EOT to the judge. Step 1108 is typically performed immediately without any wait time and includes transmitted a message to the judge accepting the transaction 1100.

At step 1110, transaction data is transmitted to the appropriate systems (e.g., the judge system). At this time, the requesting system waits to receive a particular message (e.g., an EOT-EOT).

At step 1122, the participant server system receives the transaction data transmitted by the requesting system ("requestor") in step 1110.

At step 1124, the participant server system determines whether to accept the transaction based on the transaction data received in step 1222.

At step 1126, the participant server system locks local records and completes audits (waited).

At step 1128, the participant server system sends metadata and an ACK-EOT to the judge system. The metadata can include a timestamp and clock value of the participant server system used to authenticate the message as described herein according to various embodiments. The participant server system then enters an idle/wait state (AWAITIO).

At step 1142, the judge receives the ACK-EOT message from the requesting system causing an interrupt. The ACK-EOT message can include a selection notification and metadata including a clock value and timestamp.

At step 1144, the judge system builds and updates tables related to the transaction 1100.

At step 1146, the judge system enters an idle state and waits to receive the ACK-EOT sent by the participant server system.

At step 1148, the judge system determines if the ACK-EOT has been received and that all participants have responded. If not, the judge system waits to receive additional responses. Once all participants have responded, the judge system proceeds to step 1150.

At step 1150, transmission delays are determined (e.g., using an AI algorithm) such that all participating systems receive EOT-EOT notifications substantially simultaneously.

At step 1152, the judge system transmits EOT-EOT messages including the pending ending "local" time to all other systems.

Continuing on FIG. 11B, at step 1154, the requesting system wakes from idle (WAITIO) upon receiving the EOT-EOT and determines if the EOT-EOT is valid and corresponds to the instant transaction 1100. Steps 1154-1160 performed by the requesting system can be performed in parallel with steps 1162-1168 performed by the participant server system.

At step 1156, the requesting system sends an EOT-EOT to all other participants (no wait).

At step 1158, the requesting system sends an EOT-EOT to the judge and unlocks records.

At step 1160, the end of the transaction is audited by the requesting system.

Steps 1162-1168 performed by the participant server system are substantially the same as steps 1154-1160 performed by the requesting system. At step 1162, the participant server system wakes from idle (WAITTIO) upon receiving the EOT-EOT and determines if the EOT-EOT is valid and corresponds to the instant transaction 1100.

At step 1164, the participant server system sends an EOT-EOT to all other participants (no wait).

At step 1166, the participant server system sends an EOT-EOT to the judge and unlocks records.

At step 1168, the end of the transaction is audited by the participant server system.

At step 1170, the judge system awakes from an idle state when an EOT-EOT message has been received. The judge system determines if the EOT-EOT is valid and corresponds to the instant transaction 1100.

At step 1172, once all EOT-EOTs have been received and determined to be valid, the judge audits the end of transaction 1100 (pending ending time) and cleans up tables. At this point transaction 1100 has been completed and ends.

Embodiments of the present invention are thus described. While the present invention has been described in particular embodiments, it should be appreciated that the present invention should not be construed as limited by such embodiments, but rather construed according to the following claims.

What is claimed is:

1. A method of conducting an electronic transaction between remote computer systems, the method comprising:

transmitting a first message comprising transaction metadata from a first computer system to a second computer system, wherein the second computer system audits a transaction record stored at the second computer system responsive to receiving the first message;

transmitting a second message comprising the transaction metadata from the first computer system for receipt by a third computer system causing an interrupt at the third computer system, wherein the third computer system modifies a database of the third computer system responsive to receiving the second message;

receiving a transaction acknowledgment at the first computer system from the second computer system; and marking the electronic transaction as complete at the first computer system responsive to the transaction acknowledgment.

2. The method of claim 1, wherein the transaction metadata of the first message comprises a clock rate of the first computer system.

3. The method of claim 2, further comprising the third computer system verifying an identity of the first computer system according to the clock rate of the first computer system.

4. The method of claim 2, further comprising the third computer system decrypting content of the first message according to the clock rate of the first computer system.

5. The method of claim 1, wherein the transaction metadata of the first message comprises location information of the first computer system.

6. The method of claim 5, further comprising the third computer system verifying an identity of the first computer system according to the location information of the first computer system.

7. The method of claim 1, further comprising modifying a database of the first computer system prior to transmitting the first message comprising the transaction metadata from the first computer system for receipt by the third computer system.

8. The method of claim 1, further comprising:

identifying a crash of the third computer system prior to marking the electronic transaction as complete at the first computer system; and rolling back the database of the first computer system to a prior state.

9. The method of claim 1, further comprising the third computer system transmitting another transaction acknowledgement to the second computer system, wherein the second computer system marks the electronic transaction as pending complete at the time the another transaction acknowledgment is received.

10. An apparatus comprising:

a processor; and a database, wherein the processor is operable to:

initiate a transaction by modifying the database according to transaction metadata;

transmit a first message comprising the transaction metadata to a second computer system, wherein the second computer system audits a transaction record stored at the second computer system responsive to receiving the first message;

transmit a second message comprising the transaction metadata for receipt by a third computer system causing an interrupt at the third computer system, wherein the third computer system modifies a database of the third computer system responsive to receiving the second message;

receive a transaction acknowledgment at the first computer system from the third computer system; and mark the transaction as complete at the first computer system responsive to the transaction acknowledgment.

11. The apparatus of claim 10, wherein the transaction metadata of the second message comprises a clock rate of the first computer system.

12. The apparatus of claim 11, wherein the third computer system verifies an identity of the first computer system according to the clock rate of the first computer system.

13. The apparatus of claim 11, wherein the third computer system decrypts content of the first message according to the clock rate of the first computer system.

14. The apparatus of claim 10, wherein the transaction metadata of the first message comprises location information of the first computer system.

15. The apparatus of claim 14, wherein the second computer system verifies an identity of the first computer system according to the location information of the first computer system.

16. The apparatus of claim 10, wherein the processor is further operable to modify a database of the first computer system prior to transmitting the first message comprising the transaction metadata from the first computer system for receipt by the second computer system.

17. The apparatus of claim 10, wherein the processor is further operable to:

identify a crash of the third computer system prior to marking the transaction as complete at the first computer system; and roll back the database of the first computer system to a prior state.

18. The apparatus of claim 10, wherein the second computer system transmits another transaction acknowledgement to the second computer system, and wherein the second computer system marks the transaction as pending complete at the time the another transaction acknowledgment is received.

19. A non-transitory computer-readable storage medium having embedded therein program instructions, which when executed by one or more processors of a device, causes the device to execute a process that automatically conducts an electronic transaction with a remote computer system, the process comprising:

transmitting a first message comprising transaction metadata from a first computer system to a second computer system, wherein the second computer system audits a transaction record stored at the second computer system responsive to receiving the first message;

transmitting a second message comprising the transaction metadata from the first computer system for receipt by a third computer system causing an interrupt at the third computer system, wherein the third computer system modifies a database of the third computer system responsive to receiving the second message;

receiving a transaction acknowledgment at the first computer system from the second computer system; and marking the electronic transaction as complete at the first computer system responsive to the transaction acknowledgment.

20. The non-transitory computer-readable storage medium of claim 19, wherein the process further comprises:

identifying a crash of the third computer system prior to marking the electronic transaction as complete at the first computer system; and rolling back the database of the first computer system to a prior state.

* * * * *